May 2, 1967  A. S. WESTERSTEN  3,316,762
APPARATUS AND PROCESS FOR MEASURING FLUID FLOW
Filed Aug. 28, 1963  5 Sheets-Sheet 1

ALLAN S. WESTERSTEN,
INVENTOR.

BY Warren T. Jessup
WARREN T. JESSUP,
ATTORNEY

May 2, 1967 A. S. WESTERSTEN 3,316,762
APPARATUS AND PROCESS FOR MEASURING FLUID FLOW
Filed Aug. 28, 1963 5 Sheets-Sheet 4

ALLAN S. WESTERSTEN,
INVENTOR.

BY Warren T. Jessup

WARREN T. JESSUP,
ATTORNEY

United States Patent Office 3,316,762
Patented May 2, 1967

3,316,762
APPARATUS AND PROCESS FOR MEASURING FLUID FLOW
Allan S. Westersten, Norwalk, Calif., assignor, by mesne assignments, to Statham Instruments Inc., Los Angeles, Calif., a corporation of California
Filed Aug. 28, 1963, Ser. No. 305,090
14 Claims. (Cl. 73—194)

This invention relates to apparatus and process for measuring fluid flow, and more particularly to improvements which substantially eliminate the effect of error signals or quantities which are inherent in the system but which are not a function of the fluid flow itself.

It is an object of this invention to accurately measure the flow of a conducting fluid, by eliminating error signals or readings.

It is a further object of this invention to provide for the substantial elimination of such error signals without requiring a blocking of the fluid flow. This attribute is particularly valuable in the measurement of blood flow, where such stoppage would require the occlusion of the blood vessel with consequent danger to the animal or other system involved.

A serious shortcoming of prior art flow meters has been base line instability and mutual interference between adjacent tranducers or measuring probes. It is an object of this invention to substantially eliminate these common faults.

It is a further object of this invention to provide a system and process in which unwanted error signals may be constantly monitored and adjusted to minimum without occluding the flow vessel or lumen.

In accordance with these and other objects which will become apparent hereinafter, preferred forms of the present invention will now be described with reference to the accompanying drawings wherein:

FIGURE 1 is a block diagram of the preferred form of the present invention.

FIGURE 2 is a side view of the fluid conduit or lumen and the pickup probe and energizing means associated therewith.

FIGURE 3 is a cross-sectional view of the lumen and pickup probe.

FIGURES 4 through 12 are idealized wave forms at various points in the system illustrating a technique for eliminating cross talk or interference between closely adjacent probes.

FIGURE 19 is a block diagram illustrating, through a modification of FIGURE 1, a second form of the present invention.

FIGURES 20 through 25 are wave forms illustrating signals appearing at various points in the block diagram of FIGURE 19.

The fluid flow measuring apparatus of the present invention is generally of the type that is disclosed for example in Kolin Patent 2,149,847. The advantages of the present invention are particularly useful in blood flow measurement of the general type discussed in the Proceedings of the National Academy of Sciences, vol. 43, No. 6, pages 527–540, June 1957, to which reference is made for a background of the present invention.

Figure 1:
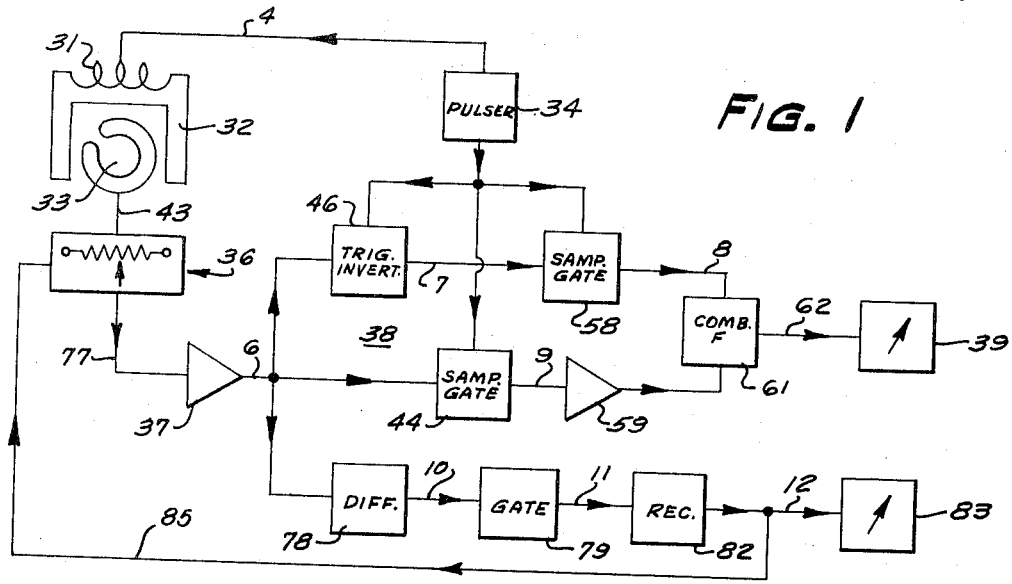
FIGURES 1 through 18 illustrate a preferred form of the present invention.
Figure 4:
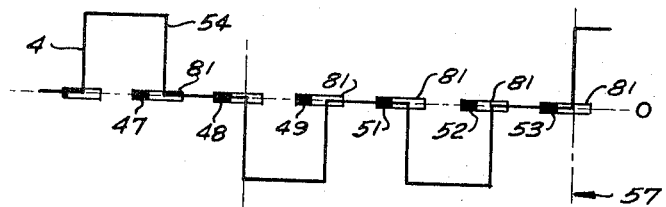

Referring to the drawings, there is illustrated in FIG. 1 a measuring system comprising an electromagnet coil or winding 31 having a core 32 by means of which a magnetic field is applied transversely to a lumen 33. The magnetic field winding 31 is energized by a pulser 34 which supplies, through channel 4, magnetic energizing pulses substantially as shown in FIG. 4.

The fluid flowing in the lumen 33 is a conducting fluid, so that whenever a magnetic field exists across the lumen there will be generated, in accordance with well known electric generation principles, a potential across the lumen at right angles to the direction of the magnetic field. This potential is picked up by probe means 40 and applied across a balancing rheostat 36, to be described in detail hereinafter, and thence through an amplifier 37 to a gating complex 38, where the signal is selectively sampled and thence applied to a suitable sensing or measuring instrument 39.

In accordance with the present invention the gating complex 38 is so arranged as to substantially eliminate from the signal 6 applied thereto all components except the one which is directly proportional to the fluid flow in the lumen 33.

The undesired creation of certain error signals and the ultimate eradication thereof may be best understood by reference to the signal wave forms illustrated in FIGURES 4 through 9 inclusive.

As noted, FIGURE 4 represents the magnetizing current applied to the winding 31, and therefore represents in general the magnetic field applied to the lumen 33.

A probe 40, consisting of electrodes 41 and 42 (FIG. 3), picks up a signal which is proportional to the flow in the lumen 33 and to the magnetic field. This flow signal may therefore also be represented by the wave form of FIG. 4.

Figure 5:
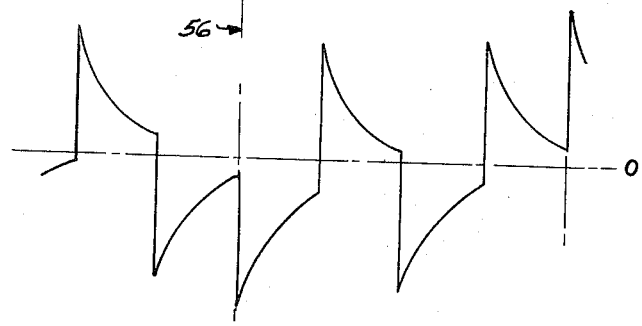

In addition to the flow signal of FIG. 4, there is induced in the pickup probe 40 by transformer action, a differential spike or signal, shown in FIG. 5. The FIG. 5 signal exists irrespective of flow or lack of flow in the lumen 33. This error signal will be referred to herein as a "transformer error signal." It is (in the classic case of a sine wave) 180° out of phase with the driving signal. Since this also is the basic relation between primary and secondary voltages in an ideal transformer, the term "transformer error signal" has been adopted to identify this particular error. The characteristics, even the existence, of this error signal are not generally appreciated in the art. Eddy currents that circulate in the fluid medium inside the lumen, as well as in paths that are completed outside the lumen, are induced according to the well known transformer law. These current paths together constitute a secondary loading or load impedance applied to this virtual transformer. The transformer voltage, or "transformer error signal" is simply the voltage measured across this secondary load impedance.

Figure 6:
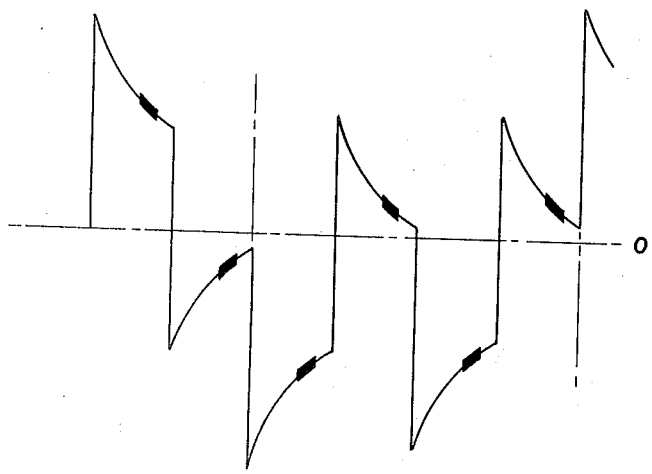

The net or aggregate signal derived from the probe 40 and applied to the channel 43 is the sum of the flow signal shown in FIG. 4 and the error signal shown in FIG. 5, and is shown in FIG. 6. This signal is applied through the adjusting rheostat 36 to be described hereinafter and thence through an amplifier 37 and through the channel 6 to the gating complex 38 shown in FIG. 1.

The signal of FIG. 6 is applied simultaneously to a sampling gate 44 and also to another gate 46 which intermittently invert the signal, every half cycle, as explained below.

Figure 7:
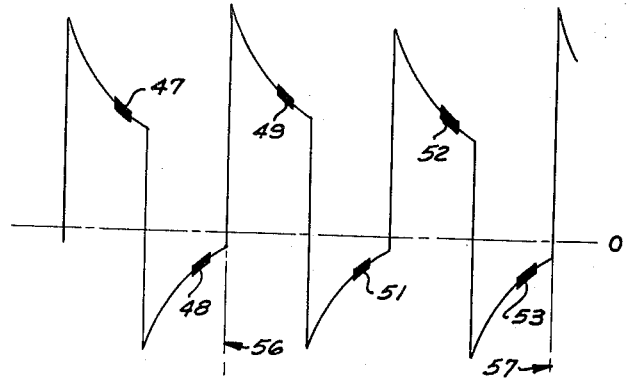

All of the gates of the complex 38, including the gates 44 and 46, are triggered by synchronizing pulses from the pulser 34 and hence are in synchronism with the energizing field. The gating intervals are shown at 47, 48, 49, 51, 52, and 53 in FIG. 4. The function of the gate 46 is such as to receive the positive and negative pulses exemplified by the pulse 54 in FIG. 4 and to invert the input signal 6 every half cycle of the wave or signal 4. In FIG. 4, a cycle consists of two positive pulses 54 followed by two negative pulses 55. Therefore a half cycle is represented by the interval from the time 56 to the time 57. The output 7 from the gated inverter 46, shown in FIG. 7, is thus the same as the input 6, except that at every half cycle the polarity is reversed. Thus the half cycle before the time 56 in FIG. 7 is substantially the same as a half cycle on FIG. 6. At time 56, however, all polarities are reversed as shown and the reversal continues until time 57 at which time the polarity is again reversed and the polarities of FIG. 6 and FIG. 7 become identical. The net result is that, while the energizing wave form FIG. 4 reverses the pulse polarity at each half cycle, the dominant pulses of FIG. 7 are always of the same polarity. By comparing FIGURE 6 with FIGURE 9, it will be seen that the gate 44 operates upon the signal 6 in the same way as the combined blocks 46 and 58 operate upon the signal 6, except that gate 44 passes only every fourth interval 48, 53, and the signal inversion takes place out of phase with the inversion produced in 46. That is, in 46, inversion takes place at time 56 and lasts until time 57; whereas, in 44 the inversion takes place at time 57 and lasts for one-half cycle, i.e., until a time corresponding to one cycle after time 56.

From the inverter 46 the signal 7 is fed to a sampling gate 58 whose function is to pass the signal 7 only during the intervals 47, 48, 49, 51, 52, 53, and so on. Gate 58 also inverts every other interval or pulse. The net result is a series of sharp pulses shown in FIG. 8 and represented by the output 8 from the sampling gate 58.

Figure 8:
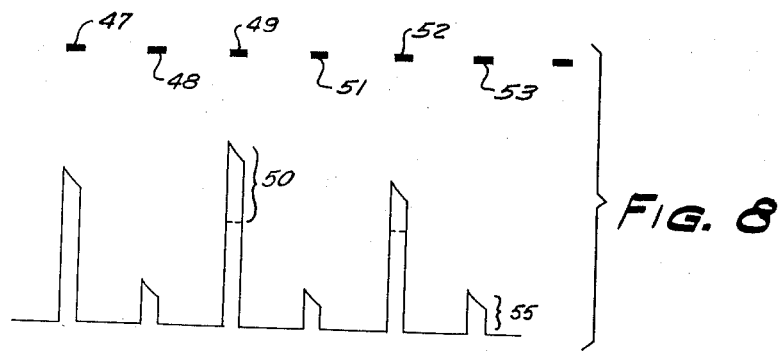

Keeping in mind that FIG. 4 represents the flow component of the composite signal, while FIG. 5 represents the error component, it will be seen that sampling intervals 48, 51, and 53 occur when there is no flow component in the signal. In similar vein the sampling intervals 47, 49, and 52 occur when both flow signal and error signal are present; therefore during these intervals the pulse in FIG. 8 is a composite of both flow and error signals.

The composite signal 6 is also applied to a sampling gate 44, as noted hereinbefore. This gate is responsive only to sampling intervals 48 and 53, that is the intervals near the end of each half cycle, which immediately precede the reversal of pulse polarity.

Figure 9:

During these intervals there is no magnetic field and hence no flow component in the signal. The output 9 from the sampling gate 44 is, as shown in FIG. 9, therefore a function only of the error signal and not of the flow signal.

In the example under description it will be noted that the output channel 8 receives four times as many error signal samples as does the output channel 9. Furthermore, as shown in FIG. 8 the error component 50 in some of the pulses is larger than in others 55. The signal in channel 9 is therefore applied to an amplifier 59 which not only inverts the signal 9 but also multiplies it by the necessary factor (slightly more than four) to make it equivalent to the error signal samples contained in the composite signal 8. As a practical matter, the gain in the amplifier is determined empirically simply by operating the system without flow and adjusting the gain of amplifier 59 until the output at 62 is zero. This not only puts the gain of the amplifier 59 at approximately 4, but also accounts for the second-order correction required by the slight difference in error signal magnitude from pulse (50) to pulse (55). This difference in error signal magnitude is due to the fact that the exponentially decaying error signals, a series of which are shown in FIG. 5, do not start from the same voltage point. Since all of the error signal curves decay exponentially with the same RC constant and toward the same asymptote, there will be slight differences in the error signals when the sample is taken, depending upon the starting point of the decay. As shown in FIG. 5, this differential in starting point is not large, but to the extent that it is present, it is offset in the amplifier 59.

At 61 the two signals 8 and 9, amplified and inverted as explained, are integrated and combined algebraically. Integration of the signal in channel 8, as reference to FIG. 8 will show, produces a signal which is proportional to the sum of two units, or samplings, the flow signal and four units of the error signal. Integration of the signal in channel 9 produces a signal which is proportional to the error signal alone, which has been multiplied by (approximately) four in the amplifier 59. As noted above, the amplification in 59 is actually slightly greater than four to compensate for the slight difference between the magnitude of the error component at 50, for example and that at 55. There is thus fed into the integrator-and-adder 61 error signals from channel 8 which are equal to the error signals from channel 9.

Thus, when the signal 9 is subtracted from the signal 8, there is delivered to the output 62 a signal which is a function only of the flow component, as illustrated in FIG. 4. This flow signal is then sensed or measured by any suitable device shown at 39.

Figure 3:
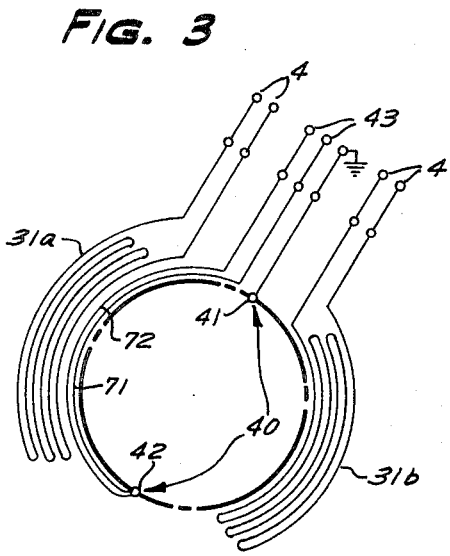

The reason for the adjustable rheostat 36 will now be explained. Referring to FIG. 3, 31a and 31b represent a pair of coils which create the magnetic flux across the lumen 33. They may be connected either in parallel or in series, and together constitute the coil or winding 31 of FIG. 1. The electrodes 41 and 42 constituting the probe 40 are placed at right angles to the field created by the winding 31, and pick up the voltage generated by the fluid flow in the lumen 33. The leads or conductors which connect to the electrodes 41 ad 42 theoretically should be exactly aligned with the magnetic field of winding 31, because otherwise they would form a flux loop in which a voltage would be generated by transformer action, independent of flow in the lumen 33 (whenever the flux changes). In practice, it has been found virtually impossible to avoid the formation of at least a very small magnetic flux loop, not only because of mechanical tolerances, but also because of the fact that the effective current path across the lumen 33 between the electrodes 41 and 42 is variable and its exact course cannot be predicted with accuracy.

Figure 2:
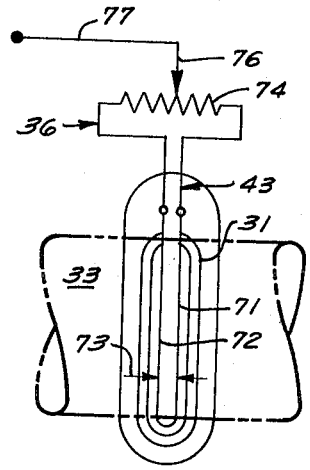

To counteract this undesired magnetic loop, which creates an error spike whenever there is a change in flux from the winding 31, two conductors 71 and 72 are connected to the electrode 42 and are slightly spaced axially of the lumen as shown at 73 in FIG. 2, so as to deliberately create a small flux loop.

In accordance with the present invention, the two conductors 71 and 72 are brought out right next to the lumen 33, between the lumen and the winding 31. In this manner the flux passing through the small loop 73 is assured of being exactly the same as the flux through the lumen 33. Thus an adjustment, when made, will accommodate only the flux in the lumen and not additional extraneous fluxes such as would be introduced if the leads 71 and 72 were to be taken from the electrode 42 outside of the winding 31, i.e. on a path not sandwiched between the winding 31 and the lumen 33.

The two external ends of the conductors 71 and 72 are connected to the respective ends of a potentiometer resistance or impedance 74 having an intermediate slider 76 to which is connected the output line 77 leading to the amplifier 37 of FIG. 1. This constitutes the box 36 of FIG. 1.

Figure 10:
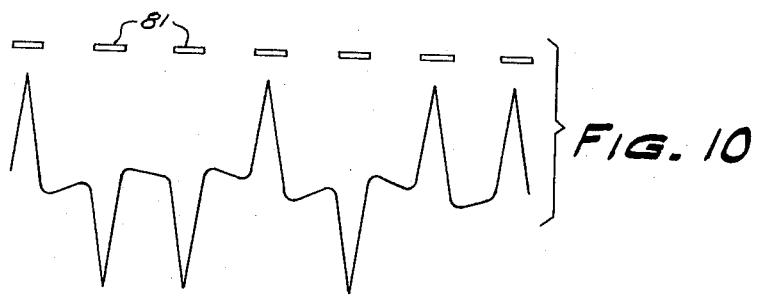
Figure 11:
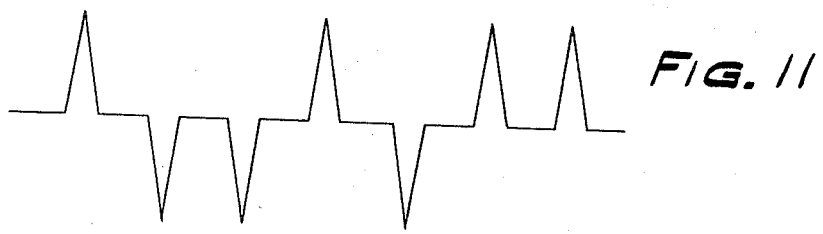
Figure 12:

The unwanted loop voltage in the lumen 33 is generated only when the flux is changing and therefore only during the leading or lagging wave front of FIG. 4. These changes in flux produce sharp spikes. By sliding the slider 76 back and forth on the rheostat 74 these spikes may be minimized with consequent minimization of this error factor in the system. This is achieved by applying the signal 6 (FIG. 6) to a differentiating circuit 78 (FIG. 1), which produces an output wave substantially as shown in FIG. 10. This signal is applied to a gate 79 which passes the signal 10 only at the flux changing intervals 81 shown in FIG. 4. The gated output is substantially as shown in FIG. 11. This output is applied to a rectifier 82 and appears substantially as shown in FIG. 12. It is then applied to a suitable measuring device 83 which simultaneously integrates and measures the pulses of FIG. 12.

The error signal shown in FIG. 10 is referred to herein as a "quadrature error signal," because (in a classic sine wave case) it occurs in quadrature with the driving voltage. Like the transformer error signal mentioned hereinbefore, it occurs only during a period of change in the magnitude of the magnetic field.

The function of the loop 71–72 is to eliminate or minimize the quadrature error signal. The function of the alternate sampling and recombination in block 61 is to eliminate the transformer error signal.

In operation, the operator moves the slider 76 back and forth until the integrated output measured at 83 is a minimum, and he thus knows that the effect of the spike loop in the lumen 33 has been adjusted to minimum. As an alternative, the signal at 12 may be fed back to the rheostat control 36 in any suitable automatic nulling method, represented schematically by channel 85, to adjust the slider 76, either physically or by an electronic equivalent, to effect a minimum or null in the integrated signal. It will be noted that whether manual or automatic nulling is used, continuous monitoring or tuning of the spikes is possible even during use of the equipment. It is not necessary either to occlude the lumen or to stop the taking of flow readings from the measuring device 39.

Figure 13:
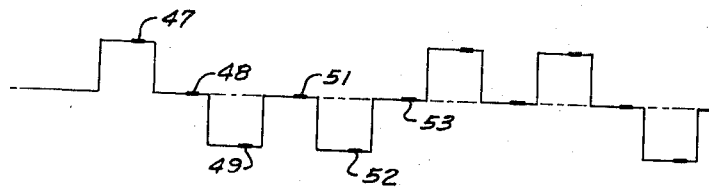
Figure 14:
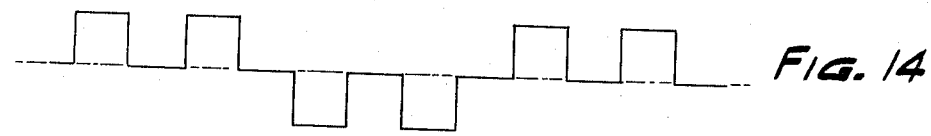

There are occasions when it is desirable to measure flow in closely adjacent fluid conduits. This is particularly so in biological work where two blood vessels may be closely adjacent and it is therefore necessary to place the probes 40 of two separate pickups very close together and around adjacent flow vessels. Inevitably the magnetic fields from the two energizing sources interact and produce cross errors from one to the other. In accordance with the present invention, such cross talk between adjacent pickups may be virtually eliminated or minimized by synchronizing the two pulsers 34 in suitable manner. One method is to displace the fields in phase 90 electrical degrees. This is illustrated in FIGS. 13, 14 and 15, wherein FIG. 13 represents the field of one pulser 34 and FIG. 14 represents the other pulser field, displaced 90 electrical degrees.

Figure 15:
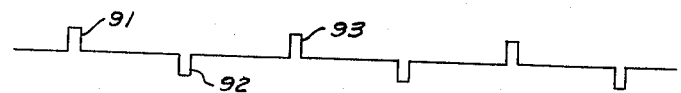

FIG. 15 illustrates the cross talk pulses which result from the interaction of one field into the other. As in FIG. 4, the numerals 47–53 represent sampling intervals. During the interval 47 the two fields 13 and 14 are both positive and therefore the interaction produces a positive cross talk pulse 91. During the interval 48 both fields are zero and therefore there is no interaction. During the interval 49, one field is negative while the other is positive so that the resulting cross talk pulse is negative, as shown at 92. During the interval 52 both fields are negative, i.e. of the same polarity, and therefore the cross talk pulse is positive, as shown at 93. Continued analysis will readily show that the integral of all the cross talk pulses 91, 92, 93, etc. comes out to be zero, therefore cancelling out the cross talk interference between these two adjacent systems.

Figure 16:
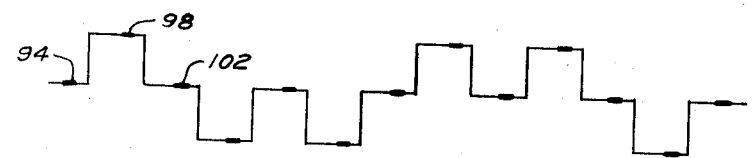
Figure 17:
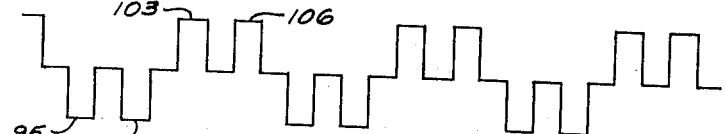
Figure 18:
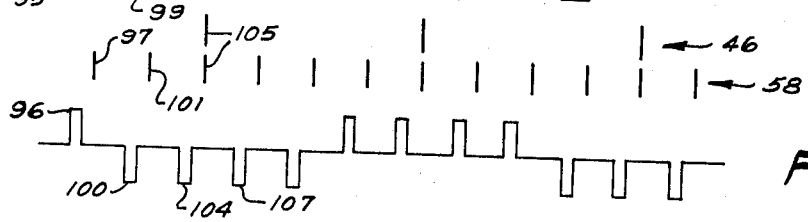

Such cross talk may also be eliminated by operating one system at a multiple of the frequency of the other system. This technique is illustrated in FIGS. 16, 17, and 18, wherein FIG. 16 represents flux in one system and FIG. 17 represents flux in the adjacent system. FIG. 18 represents the cross-talk signal inject into the pickup apparatus of FIG. 16 by cross talk from the adjacent double frequency apparatus of FIG. 17. Let it be assumed that at the sampling interval 94 the condition of the inverters 46 and 58 is such as to cause the negative cross talk signal 95 from the apparatus of FIG. 17 to produce a positive pulse 96 at the point 8 (FIG. 1) in the apparatus of FIG. 16. Timing marks shown at 46 represent the moments at which the signal polarity is reversed by the trigger inverter 46 shown in FIG. 1. The timing marks 58 similarly represent the moments when the signal polarity is reversed by the apparatus 58 of FIG. 1. Thus, at time 97 the polarity of the signals will be reversed, so that at the next sampling interval 98 the negative signal 99 will be reflected into the system of FIG. 16 as a negative going pulse 100. Another polarity reversal in the apparatus 58 then takes place at time 101, so that at sampling interval 102 the positive signal 103 reflects a negative pulse 104 into the system of FIG. 16 from the system of FIG. 17.

At time 105 polarity is simultaneously reversed in both 46 and 58, so that the subsequent positive signal 106 in the FIG. 17 system reflects a negative pulse 107 into the FIG. 16 system.

Continued analysis shows, as indicated in FIG. 18, that the pulses injected from the double frequency system of FIG. 17 into the single frequency system of FIG. 16 come in groups of four, with four negative pulses followed by four positive pulses and so on. Thus, the integral of the pulses cancels out, and there will be no net cross talk from one system into the pickup of an adjacent system.

Figure 19:
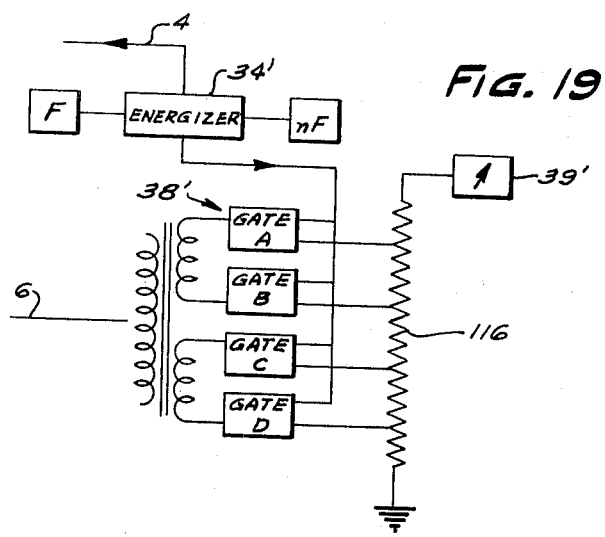
FIGURES 19 through 25 illustrate a second form of the present invention.

A second form of the invention is illustrated in FIG. 19. In this figure the pickup mechanism and loop compensating apparatus are the same as in FIG. 1. The pulser 34 of FIG. 1 is replaced by a somewhat different form of energizing source 34'. The signal 6 is fed to a somewhat different form of gating complex 38' as will now be described.

Figure 20:
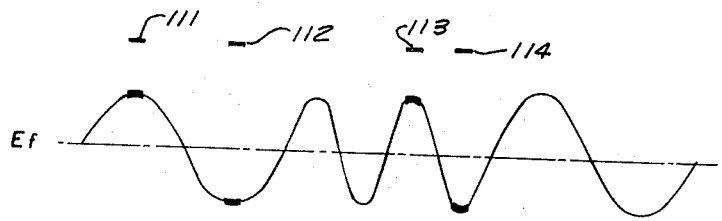

In FIG. 19 the energizing means 34' applies to its output 4 a sinusoidal alternating wave which cyclically varies in frequency. In the specific instance shown, the energizer 34' delivers a given number of cycles of frequency F followed by a given number of cycles of a multiple of frequency F. Specifically as shown in FIG. 20, there is one full cycle of frequency F followed by an equal period of frequency 2F, which means that there are two cycles of frequency 2F. As in the modification of FIG. 1 the flow component of the output signal 6 is substantially proportional to the energizing field shown in FIG. 20.

Figure 21:
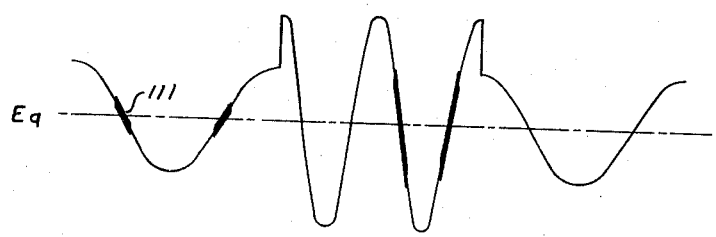
Figure 22:
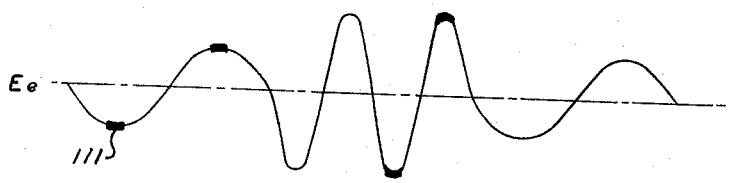

By transformer action within the pickup mechanism there is also generated an unwanted quadrature voltage, which is proportional to the differential of the field current and is independent of the flow magnitude. This quadrature field component in the output signal is shown in FIG. 21. There is still another error signal which is independent of fluid flow and this is a transformer generated signal which is 180° out of phase with the flow signal. Its magnitude is directly proportional to the frequency of the energizing alternating field and hence also to the frequency of the flow signal component shown in FIG. 20. This error signal is shown in FIG. 22. It will be noted that where the frequency of the flow signal 20 doubles, the magnitude of the error signal doubles, although its frequency remains the same as that of the flow signal component and its phase continues to be directly opposite to that of the flow signal component at 20.

The total or aggregate signal applied to the terminal 6 in FIG. 19 is the sum of the three component waves shown in FIGS. 20, 21, and 22.

In accordance with the present invention, this total signal is applied to four different gates A, B, C, and D, all of which are triggered, in a predetermined and desired synchronism, from the energizing source 34' that supplies the original field current. The four gates have the following gating characteristics:

Gate A is open (conduction) only during the interval 111 (FIG. 20).
Gate B is open only during the interval 112.
Gate C is open during the intervals 111 and 114.
Gate D is open during the intervals 112 and 113.

As will be noted in FIGURE 19, the signals applied to the gates B and D are inverted, so that the polarity of these signals, when applied to the totalizing network 116, is of reversed polarity.

The effect of the gates A, B, C, and D may be most easily understood by considering the effects of these gates on the three signal components $E_f$, $E_q$, and $E_e$, representing, respectively, the flow component of FIG. 20, the quadrature component of FIG. 21, and the error component of FIG. 22.

Figure 23:
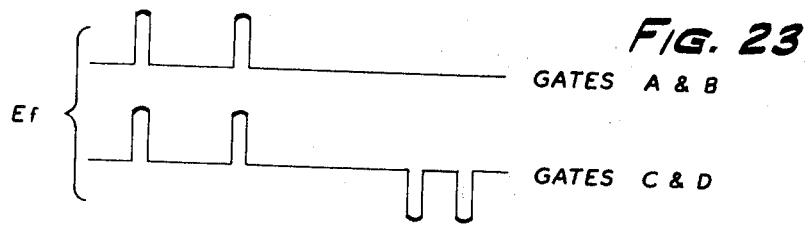

In FIG. 23, the effect of the gates on the flow component E$f$ is shown. As noted, there passes through gates A and B a positive pulse during interval 111, and also a positive pulse during interval 112, because while the flow component is negative during interval 112, the effect of gate B is to reverse polarity. During intervals 113 and 114 the gates A and B do not pass any signal at all. Through gates C and D, as a result of the flow signal E$f$, there passes a positive pulse during interval 111 and a positive pulse during interval 112, just as through gates A and B. Through the aggregate or composite of gates C and D during intervals 113 and 114, there also passes, as a result of the flow component of signal, E$f$, negative pulses during intervals 113 and 114. From the above it will be seen that from the aggregate of gates A and B, there will be derived a signal whose integral is a positive value proportional to the magnitude of the flow component of the signal which is picked up by the probes. On the other hand, the integrated value of the flow component of the probe signal which is passed through gates C and D will be zero, because the two positive pulses passed at intervals 111 and 112 are exactly cancelled by the two negative pulses passed during intervals 113 and 114.

Figure 24:
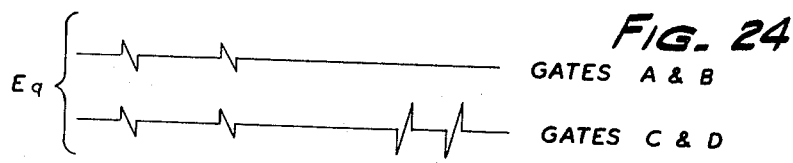

Turning now to the effect of the gates on the quadrature voltage E$q$ of FIG. 21, this is shown in FIG. 24. Since the intervals 111–114 are chosen so that they intersect the zero intercept of the quadrature voltage in each case, it follows that the integral of the quadrature voltage passed through all the gates will always be zero, as shown in the two graphs represented in FIG. 24.

Figure 25:
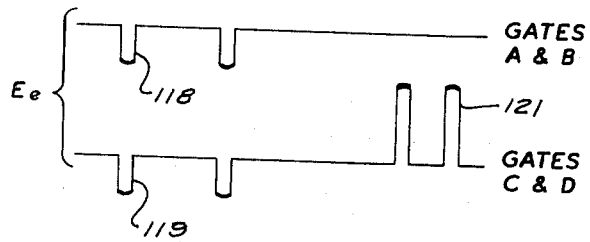

The effect of the gates on the error voltage E$e$ of FIG. 22 is shown in FIG. 25. Through the aggregate of gates A and B there is passed a negative error voltage 118 during interval 111 and a negative error voltage during interval 112, it being remembered that gate B inverts the polarity of the signals. Through gates C and D there is passed a similar pulse 119 of negative voltage during the intervals 111 and 112. During the intervals 113 and 114 there is passed a positive pulse 121, the magnitude of which is twice that of the magnitude of the pulses 118 and 119, as will be readily seen by observing the graph in FIG. 22.

Since the magnitude of the error signal E$e$ is proportional to the frequency of the energizing magnetic field E$f$ it will be readily seen that the pulses 121 taken during the intervals 113 and 114 will have twice the magnitude of the pulses 118 and 119 taken during intervals 111 and 112. The net effect is that the aggregate integral of the gates A, B, C, and D, insofar as the error voltage or component E$e$ is concerned, will be zero, because each pair of pulses 118 and 119 passed during the intervals 112 and 111, will be offset by an oppositely poled single pulse 121 having twice the magnitude. Therefore, between the two groups of gates A–B and C–D the error component E$e$ will cancel out, leaving an aggregate from all four gates of a signal which is a function only of the flow component E$f$.

In FIG. 19, this aggregate composite voltage is taken from the resistive network 116 and applied to any suitable measuring device 39′, which integrates and reads the net signal, proportional to the flow in the lumen.

In the example given, the two frequencies F and $n$F have been selected having a ratio of one to two. It will be readily understood, however, that the principles of the present invention can be employed wherever there are two different frequencies which are cyclically and repetitively employed for the energizing field of the pickup mechanism.

Athough the two illustrated forms of the present invention each embodies somewhat different inventive concepts, it will be noted that there is also common to both of them the concept of two gates or groups of gates, one of which puts out a signal which, when integrated, is a function of the composite signal, i.e. the flow signal plus the error signal, while the other puts out a signal which when integrated is a function only of the error signal. Thus, the error signal can be subtracted from the composite signal to derive the desired flow signal. In the first form illustrated the distinction between the signals is present from the very moment of sampling. In the second form, however, this distinction does not appear until after the signals are integrated.

Irrespective of which form of the invention is employed, however, it will be readily seen that both of them have the common practical advantage of deriving an aggregate output signal which is a function substantially only of the flow in the lumen. Extraneous error signals are inherently eliminated at all times during flow of the fluid, without requiring occlusion or special calibrating and sampling techniques, which would be extremely difficult and hazardous in the case of many biological applications.

While the instant invention has been shown and described herein in what is conceived to be the most practical and preferred embodiments, it is recognized that departures may be made therefrom within the scope of the invention which is therefore not to be limited to the details disclosed herein but is to be afforded the full scope of the claims.

What is claimed is:

1. In apparatus for measuring fluid flow, said apparatus having sensing means for sensing an electrical quantity which is a function of the fluid flow, and energizing means for creating a field which, in conjunction with said flow, creates said electrical quantity, the combination comprising:

first time sampling means for sampling said electrical quantity at predetermined first intervals and delivering an output which is a composite of both a flow signal that is a function of said flow and an unwanted error signal;

second time sampling means for sampling said electrical quantity at predetermined intervals differing from said first intervals and delivering a signal which is a function substantially only of said unwanted error signal;

means for algebraically combining the outputs of said time sampling means to derive a signal which is a function of the fluid flow free of the unwanted error signal, and means for measuring said derived signal, thereby to obtain a measure of said flow.

2. In apparatus for measuring fluid flow, said apparatus having sensing means for sensing an electrical quantity which is a function of the fluid flow and energizing means for creating a field which, in conjunction with said flow, creates said electrical quantity, the combination comprising:

a plurality of time-sampling means for sampling said electrical quantity at predetermined intervals, each of said time-sampling means effecting its sampling at different intervals, at least certain of the samples embodying a composite of both a flow signal which is a function of said flow, and an unwanted error signal, means for combining the outputs of said time-sampling means to derive a signal which is representative of the flow of said fluid substantially free of said unwanted error signal, and means for measuring said derived signal, thereby to obtain a measure of said flow.

3. In apparatus for measuring fluid flow, said apparatus having sensing means for sensing an electrical quantity which is a function of the fluid flow and energizing means for creating a field which, in conjunction with said flow, creates said electrical quantity, the combination comprising:

first time-sampling means for sampling said electrical quantity at first intervals wherein said quantity embodies a composite of both a flow signal which is a function of said flow, and an unwanted error signal;
second time-sampling means for sampling said quantity at second intervals when said quantity is a function substantially only of the unwanted error signal;
combining means for combining the outputs of said time-sampling means in subtractive fashion to subtract the error signal sample from the composite signal sample; and
means for measuring the output of said combining means, thereby to sense a signal which is representative of the flow of said fluid substantially free of said unwanted error signal.

4. In apparatus for measuring fluid flow, said apparatus having means for delivering an electrical quantity which is a function of said fluid flow, and field means for applying a time-discontinuous field to the flowing fluid for creating, in conjunction with said flow, said electrical quantity, said discontinuous field generating an unwanted error signal in said electrical quantity which is unrelated to fluid flow, the combination of:
first time-sampling means synchronously responsive to said field means for sampling said electrical quantity at intervals wherein said electrical quantity is a function of both a flow signal proportional to said flow and an unwanted error signal resulting from said discontinuous field;
second time-sampling means synchronously responsive to said field means for sampling said electrical quantity at intervals when said field is substantially discontinued, and thus when said electrical quantity is substantially a function only of said unwanted error signal;
combining means for combining the outputs of said two sampling means, with said error signal from said second sampling means being of subtractive polarity with respect to the error signal component in the output of said first sampling means, thereby to substantially eliminate the effect of said error signal component; and
means for measuring the output of said combining means, thereby to measure the fluid flow substantially free of error signal introduced by the discontinuity of said field means.

5. In apparatus for measuring fluid flow, said apparatus having probe means for sensing a voltage generated in the fluid, and field means for applying, at intervals, a field to the fluid in the vicinity of said probe means, the combination comprising:
pulse means for applying a series of energizing pulses to said field means, said pulses comprising, repetitively, a series of positive pulses followed by a series of negative pulses with intervals of no energizing in between;
first means connected to the output of said probe means and synchronously responsive to said pulse means for inverting the output of said probe means at each half cycle of the signal output put out by said probe means;
second means connected to the output of said first means and synchronously responsive to said pulse means for time-sampling and gating the output of said first means and for inverting the polarity of every other sample passed, the output of said second means comprising a pulsating signal having a magnitude, when integrated, which comprises a flow signal which is a function of the flow of said fluid, and an unwanted error signal which is generated upon each change in field magnitude;
third means for receiving the output of said probe means and synchronously responsive to said pulse means for gating the signal from said probe means intermittently and at intervals when said flow signal is substantially zero by virtue of the absence of field from said field means, the output of said third means, when integrated, being a function of said error signal;
means for combining and integrating the outputs of said second and third means to produce an integrated signal which is a function of said fluid flow substantially free of error injected by said change in field; and
means for measuring said integrated signal.

6. In fluid flow measuring apparatus having means for generating a magnetic field substantially transverse to the flow of fluid, and probe means in contact with the flowing fluid,
a pair of conductors each having an end connected to said probe means and residing on slightly spaced and parallel paths disposed between the flowing fluid and the magnetic field generating means,
impedance means,
the ends of said conductors being connected to the respective ends of said impedance means, and
conductor means connected to said impedance means intermediate its ends for extracting a signal from said probe means which is compensated for errors resulting from error signals appearing at said probe, by the location of, and area between, said conductor means.

7. Apparatus in accordance with claim 6 including in addition means for differentiating said signal, means for rectifying said differentiated signal, and means responsive to said rectified signal for minimizing said differentiated signal.

8. Apparatus in accordance with claim 6 including in addition means for differentiating said signal, means for rectifying said differentiated signal, and means for measuring the magnitude of said rectified signal.

9. In apparatus for measuring fluid flow, said apparatus having sensing means for sensing an electrical quantity which is a function of the fluid flow and energizing means for creating a field which effects such electrical quantity, the combination comprising:
means for differentiating said electrical quantity,
means for rectifying said differentiated quantity, and
means for sensing the magnitude of said rectified quantity.

10. In apparatus for measuring fluid flow, said apparatus having sensing means for sensing an electrical quantity which is a function of the fluid flow, the combination of:
energizing means for creating an alternating field which cyclically varies in frequency, said field effecting said electrical quantity, said electrical quantity being a composite composed of a flow signal which is a function of said flow and an unwanted error signal which is independent of said flow,
a plurality of time-sampling means for sampling said electrical quantity at predetermined intervals, at least one of said intervals occurring during one frequency of said electrical field and at least another interval occurring during a different frequency of said field,
means for combining the outputs of said time sampling means to derive a signal which is representative of the flow of said fluid substantially free of said unwanted error signal, and means for measuring said derived signal, thereby to obtain a measure of said flow.

11. Apparatus for measuring fluid flow comprising, in combination:
energizing means for creating an alternating field in said fluid flow, the frequency of said alternating field being cyclically varied,
sensing means for sensing an electrical quantity which is a function of said fluid flow and of said field, said electrical quantity being a composite of a flow signal which is a function of said flow and of an unwanted error signal which is independent of said flow,
first time sampling means for sampling said electrical quantity at intervals during a first frequency of said electrical field, second time sampling means for sampling said quantity at intervals occurring during said first frequency and also during another frequency of said electrical field, means for combining the outputs of said time sampling means to derive a signal which is representative of the flow of said fluid substantially free of said unwanted error signal, and means for measuring said derived signal thereby to obtain a measure of said flow.

12. Process for the measurement of fluid flow comprising:
creating a single signal which is a function of said flow and also of an error;
deriving from said single signal a second signal which is a function of said flow and of said error;
deriving from said single signal a third signal which is a function only of said error;
combining said second and third signals to produce a fourth signal which is a function of said flow substantially free of said error; and
measuring said fourth signal.

13. Process for the measurement of fluid flow comprising:
creating a single signal which is a function of said flow and also of an error injected by an energizing means;
deriving from said single signal a second signal which is a function of said flow and of said error;
deriving from said single signal a third signal which is a function substantially only of said error;
algebraically combining said second and third signals to produce a fourth signal which is a function of said flow substantially free of said error; and
measuring said fourth signal.

14. Process for the measurement of fluid flow comprising:
flowing fluid in an energizing field;
creating from the flow of said fluid a signal which is a function of the fluid flow and also of an error;
sampling said created signal at predetermined first intervals when said created signal represents a function of said flow and also of said error;
sampling said created signal at second intervals not coincident with said first intervals, when said created signal is substantially a function only of said error;
combining the signal samples thus made; and
measuring the combined signal samples to derive a measure which is a function of said flow substantially free of said error.

References Cited by the Examiner

UNITED STATES PATENTS 2,607,223   8/1952   Fleming _____ 73—194
3,161,047   9/1964   Griswold _____ 73—194

OTHER REFERENCES

Clark et al.: The Review of Scientific Instruments, vol. 20, No. 12, December 1949, pages 951–954.

Einhorn: Transaction of the Royal Society of South Africa, vol. 28, 1940–1941, pages 143–160; pages 146–148, 155, and 156 relied upon.

Shirer et al.: IRE Transaction on Medical Electronics, December 1959, pages 232-234.

RICHARD C. QUEISSER, *Primary Examiner.*

LAWRENCE R. FRANKLIN, *Assistant Examiner.*